US012600440B2

(12) United States Patent
Magnusson

(10) Patent No.: US 12,600,440 B2
(45) Date of Patent: Apr. 14, 2026

(54) TRANSFER SYSTEM FOR TRANSFERRING A MEDIUM BETWEEN FACILITIES

(71) Applicant: Econnect Energy AS, Oslo (NO)

(72) Inventor: Stian Tunestveit Magnusson, Oslo (NO)

(73) Assignee: Econnect Energy AS, Oslo (NO)

( * ) Notice: Subject to any disclaimer, the term of this patent is extended or adjusted under 35 U.S.C. 154(b) by 95 days.

(21) Appl. No.: 18/699,073

(22) PCT Filed: Oct. 14, 2022

(86) PCT No.: PCT/EP2022/078683
§ 371 (c)(1),
(2) Date: Apr. 5, 2024

(87) PCT Pub. No.: WO2023/062206
PCT Pub. Date: Apr. 20, 2023

(65) Prior Publication Data

US 2024/0400163 A1 Dec. 5, 2024

(30) Foreign Application Priority Data

Oct. 14, 2021 (NO) .................................... 20211245

(51) Int. Cl.
*B63B 27/34* (2006.01)
*B63B 22/02* (2006.01)
(Continued)

(52) U.S. Cl.
CPC ............ *B63B 27/34* (2013.01); *B63B 22/021* (2013.01); *B63B 27/25* (2013.01); *B67D 9/00* (2013.01)

(58) Field of Classification Search
CPC .... B63B 27/34; B63B 27/24; Y10T 137/8807
See application file for complete search history.

(56) References Cited

U.S. PATENT DOCUMENTS 3,154,118 A * 10/1964 Silveston ................. B67D 9/02 192/93 R
8,864,420 B2 * 10/2014 Foo ....................... E02B 17/021 414/137.1

(Continued)

FOREIGN PATENT DOCUMENTS

EP 2 433 901 A1 3/2012
EP 2 508 417 A2 10/2012
WO WO-2009071563 A2 * 6/2009 ............ B63B 27/24

OTHER PUBLICATIONS

"Dehonit / Permali Tank supports for LNG and LPG vessels" by dehonit (Year: 2025).*

(Continued)

*Primary Examiner* — David Colon-Morales
(74) *Attorney, Agent, or Firm* — Osha Bergman Watanabe & Burton LLP

(57) ABSTRACT

A transfer system for transferring a medium between a first facility and a second facility includes a first pipe spool, a compensator, a second pipe spool, a coupling assembly, a transfer skid, and pipe supports. The first pipe spool connects to a manifold on a deck of the first facility and the compensator. The second pipe spool connects to the compensator and a transfer pipe through the coupling assembly. The compensator allows a relative motion between the first and second pipe spools. The transfer pipe is connected to the second facility. The transfer skid includes an inboard assembly on a second deck of the first facility and an outboard assembly with a structural frame and pipe supports. The structural frame includes an inner cross-sectional area with pipe supports that allows passage of the second pipe spool, the coupling assembly, and the transfer pipe.

33 Claims, 10 Drawing Sheets

(51) Int. Cl.
*B63B 27/25* (2006.01)
*B67D 9/00* (2010.01)

(56) References Cited

U.S. PATENT DOCUMENTS

| | | | | |
|---|---|---|---|---|
| 8,882,428 | B2 * | 11/2014 | Fikes | B63B 27/34 414/142.2 |
| 9,004,102 | B2 * | 4/2015 | Foo | B63B 27/34 294/81.1 |
| 9,004,103 | B2 * | 4/2015 | Foo | B63B 27/34 294/81.1 |
| 9,580,153 | B2 * | 2/2017 | Lane | B67D 9/00 |
| 10,532,796 | B2 * | 1/2020 | Knutsen | B63B 22/023 |
| 10,994,812 | B2 * | 5/2021 | Colmard | B63C 1/06 |
| 11,679,844 | B2 * | 6/2023 | Liu | B67D 9/02 441/3 |
| 2012/0152366 | A1 | 6/2012 | Foo et al. | |
| 2012/0230772 | A1 | 9/2012 | Foo et al. | |

OTHER PUBLICATIONS

International Search Report issued in corresponding International Application No. PCT/EP2022/078683, mailed on Mar. 3, 2023 (5 pages).
Written Opinion issued in corresponding International Application No. PCT/EP2022/078683, mailed on Mar. 3, 2023 (8 pages).
Search Report issued in counterpart Norwegian Patent Application No. 20211245 mailed on Apr. 19, 2022 (2 pages).

* cited by examiner

TRANSFER SYSTEM FOR TRANSFERRING A MEDIUM BETWEEN FACILITIES

FIELD OF INVENTION

The present invention is related to a transfer system for transferring a medium between facilities. In particular, the present disclosure relates to a transfer system including a transfer skid.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Transfer systems includes various support structures provided on the floating or non-floating facilities such as ships, vessels, storage tanks, etc. for providing support to the transfer means such as pipes, hoses, manifolds etc. The transfer means used may differ depending on the medium being transferred and other operational factors. Further, the transfer means enable easy transfer or receiving of medium such as liquids, liquefied gases, compressed gases and fluidized amorphous solids and so on. The transfer support structure used depends on various operational conditions such as environmental conditions, location, depth of the water body, type and nature of medium being transferred; types of facilities between which the transfer is taking place and so on. The transfer support structure provides support to the transfer means in order to efficiently and easily transfer or receive the medium between various facilities.

In one relevant art a transfer system and a method for transferring LNG and/or electric power is described which shows a floating, semi-submersible transfer structure. The floating structure is moored to a docking station, a pier or mooring means, the transfer system is further provided with a connection between the floating structure and the transfer structure which comprises a mechanical connection arrangement with the capability of producing attractive forces to the hull of the floating structure. The transfer system, even though is said to ensure a continuous transfer of LNG and/or power for an extended time, does not disclose any provision for sustaining a safe transfer during adverse weather conditions, which is an inherent problem of the transfer system.

In another art, a system using a catenary flexible conduit for transferring a cryogenic fluid, in an offshore transport vessel unloading system is described. The transfer structure used is called as stab in support structure which guides to facilitate alignment of the pipe spool to the manifold flange. However, such type of support structure fails to support all the components of fluid transfer system for a continuous transfer between floating unit (FSRU OR FSU) and a floating or non-floating facility. Also, the support structure provides no provision for load transfer from the pipe spool and other transfer structures.

In another art, a tie-in system is described to tie-in a transfer pipe to a support unit. The tie-in system is used for floating and/or submerged flexible pipes and hoses or aerial hoses that are connected to a process system on a marine installation such as ships, offshore or onshore support units and marine terminals. A chute device is attached to the support unit and accommodates the transfer pipe. The tie-in device connects to the tie-in member on the support unit in order to transfer the tension loads from the transfer pipe to the support unit.

In another art, an apparatus for mooring a floating vessel comprising a semi-submersible floating dock, a single point mooring system and at least one rigid arm is described. The rigid arm is pivotally attached to one of the semi-submersible floating dock and the single point mooring system and is suspended from the other of the semi-submersible floating dock and the single point mooring system by at least one tension member.

In another art, an apparatus for mooring a floating vessel comprising a semi-submersible floating dock, a single point mooring system and at least one rigid arm, wherein the rigid arm is pivotally attached to one of the semi-submersible floating dock and the single point mooring system and is suspended from the other of the semi-submersible floating dock and the single point mooring system by at least one tension member. The rigid arm rigidly moors a vessel and permits sufficient motion of the mooring means such that fluid transfer between the vessel and the receiving terminal can occur in heavy seas. However, this disclosure cannot explain connection between supporting arm and transfer line. As well as this line would be helpful only in the condition of emergency release or rapid connection, it fails to disclose an access of different components and pipes between supporting arms.

In another art, an underwater cryogenic pipeline system is described which shows underwater liquefied natural gas pipeline systems for use in ice infested waters to transfer liquefied natural gas between an onshore production or storage facility and an offshore vessel. The pipeline is anchored to the frame at a plurality of spaced apart locations. The system is preferably fabricated in modules and assembled on site. The elongated frame is anchored to the soil in order to bear axial load of the pipeline, however it fails to disclose that entire pipe section are inside this frame such as expansion joints are outside of this frame. Moreover, the frame may support horizontal pipe line and provides no provisions for support of vertical pipe sections which may extend in the floating unit.

In yet another art, a system for transferring a fluid product between a carrying vessel and a shore installation is described. The system for transferring a fluid product describes a transfer arrangement essentially comprising one connection module intended to be connected at one end to a vessel's manifold and, associated with each module, a flexible transfer pipe advantageously in the form of a flexible cryogenic line. The flexible transfer pipes are permanently fixed at one end to a gantry resting on the main platform, while the other free end can be connected to a connector positioned at the other end of the connection module, so it is only suitable for attachment of flexible pipe near the floating structure, and it will not support any free vertical flexible pipes. Also, the system provides no provisions for the providing of support or compensation for the movement between the vessel's manifold and the flexible pipes.

The concepts available today, clearly don't take into account the complete set of challenges related to either the cryogenic or high-pressure transfer situation also the challenges related to shallow water or permanent continuous fluid transfer. Large forces arise in the pipe system due to a change in internal pressure due to both hoop- and axial stress and can cause damage to potential flange connections or bends. Further, for a cryogenic transfer system, the thermal contractions are significant and if not considered in the design, structural damage may occur. Further, the releasable part of the emergency release systems have the potential to damage the vessel hull and/or the components at the free end of the flexible pipe, or create sufficient heat for ignition of gas vapour. The same challenge also relates to the planned connection and disconnection of the floating hose due to for example deteriorating metocean conditions or maintenance. In relation to maintenance, the prior art often requires dedicated scaffolding which is deficient in properly securing dropped objects. Moreover, such scaffoldings increases risk for personnel due to the complexity of the maintenance scaffoldings. Further, the transfer structures of prior art often require complete customization for each project depending on hull type, location of manifold, environmental conditions, water depth etc.

Therefore, the transfer systems and the support systems used in the conventional art are limited to be used for a specified purpose and do not provide a support structure which is efficient and may be used in a variety of applications. Furthermore, there are several problems associated with the transfer line arranged between supply facilities and receiving facilities, but the prior art fails to disclose a support system to compensate the force, thermal expansion-contraction and back flow. Further, the transfer lines used in the conventional art are not well equipped to handle pressurized liquid or gas pipe temperature and may lead to various safety concerns. Therefore, there is a requirement for a transfer support system which is reliable and ensures security and safety of the transfer media through the transfer support structure in any adverse condition.

SUMMARY OF THE INVENTION

The present invention is particularly suited for high pressure fluid purposes due to the large weight and high stiffness of the reinforced transfer pipes for high-pressure application and facilitates support for large weight transfer line, and also compensates large pipe stress and movement caused by changes in fluid pressure inside the pipe.

The present invention is also particularly suited for cryogenic purposes due to both the large weight and high stiffness of the insulated, reinforced transfer pipes for cryogenic fluids, and the challenges related to thermal contraction and absorption of the related forces.

The present invention is also particularly related to transfer systems including transfer skids provided to facilitate a continuous transfer of fluid as medium between a first facility and a second facility. The invention provides a transfer system which facilitates a transfer of medium considering harsh environmental conditions and types of medium being transferred.

The objective of the current invention is to allow for a transfer of a medium between a first facility which may be a floating facility such as, but not limited to, ship, vessel, container, etc. and a second facility which may be a floating or a non-floating facility. In an embodiment, the first facility may be a floating vessel typically an floating storage regasification unit (FSRU), floating storage unit (FSU) or carrier designed for storing and/or regasification of liquefied natural gas (LNG) or Liquid Petrochemical Gas (LPG), and the second facility may be a floating unit such as a semi-submersible platform, a non-gravity based non-floating unit, a gravity based non-floating unit, a ship, or other types of offshore or onshore units and terminals with a power plant or regasification facility. Both the first facility and the second facility may be moored or installed at a suitable distance from each other for transferring the medium.

The transferred medium may be a fluid such as, but not limited to, a high pressure liquid or gas, a cryogenic medium, a liquid, a liquid gas, a gas, etc. The transferred medium may also be, but not limited to, fluidized amorphous solids, powders, etc.

The transfer pipe is configured to allow fluid communication between the first facility and the second facility. Thus, the transfer pipe may be a duct, pipe, hose, flexible pipe, flexible hose or conduit suitable for the medium to be transferred.

In one aspect of the present invention, a transfer system is described for transferring a fluid medium between a first facility which may be a first facility and a second facility which may be a second facility. The transfer system comprises a first pipe spool, a compensator, a second pipe spool, a coupling assembly, a transfer skid and one or more pipe supports. A first end of the first pipe spool may connect to a manifold of the first facility and a second end of the first pipe spool may connect to a first end of the compensator. A first end of the second pipe spool may connect to the second end of a compensator and a second end of the second pipe spool may be connectable to a first end of a transfer pipe through a coupling assembly. The compensator may allow a relative motion between the first pipe spool and the second pipe spool. The transfer pipe may fluidly connect with the second facility. The transfer skid may comprise an inboard assembly and an outboard assembly. The inboard assembly may comprise one or more mounting means suitable for mounting the inboard assembly to a second deck of the first facility. The outboard assembly may comprise a structural frame comprising an inner cross-sectional area configured to allow passage of one or more of the second pipe spool, the coupling assembly and the transfer pipe. One or more pipe supports may support the second pipe spool, the coupling assembly, the transfer pipe, or a combination thereof which may pass through the inner cross-sectional area of the transfer skid.

In aspects, the coupling assembly may be a flange to flange connection. In another aspect, the coupling assembly may comprise one or more flanges, one or more of valves, and one or more couplings or any combination thereof. In an aspect, the one or more couplings may be, but not limited to, an emergency release coupling (ERC), a Quick Connect and Disconnect Coupling (QCDC), and/or Manual Release Coupling (MRC) or any combination thereof.

In aspects, the compensator may be a flexible pipe, a flexible joint, an expansion loop or a hose. In an embodiment, the compensator may be a metallic compensator, a pipe of low bending stiffness, expansion loop or a bellow. In an embodiment, the medium being transferred may be a high pressure liquid, a cryogenic medium, etc. The compensator may allow a relative motion between the first pipe spool and the second pipe spool. This may prevent transferring of loads from forces acting on the pipe string, including the transfer pipe, to the manifold of the first facility. By introducing a compensator, the forces acting on one side of the compensator may not be significantly transferred to the other side. However, in absence of a compensator, even a minor contraction of the material due to temperature variations may cause large stresses and concentrations in bends and supports.

In aspects, the first pipe spool may comprise a rigid pipe or a flexible pipe. In other aspects, the first pipe spool may be a flange, a weld connection, or any other type of connection device suitable for connecting the flexible compensator to the manifold of the facility.

In aspects, the second pipe spool may comprise a rigid pipe or a flexible pipe. In other aspects, the second pipe spool may be a flange, a weld connection, or any other type of connection device suitable for connecting the flexible compensator to the first end of the transfer pipe through the coupling assembly.

The transfer pipe may be rigidly supported by the transfer skid through pipe support means, but vibrations and movement still propagate from one end of the pipe support to the other, potentially causing stress in the first facility manifold.

The anchoring of a pipe segment in two locations may cause large stress in the pipe segment between these two points due to forces from thermal contraction, pressure or any other such event without any means of compensation of movement and forces. Therefore, in presence of a compensator, such stress is avoided. Further, pressure surge events which may occur on either side of the compensator may not significantly affect the piping and supports on either sides of the compensator.

Further, the compensator may compensate the forces due to thermal expansion or contraction in the transfer lines and prevent back flow of the medium. In an exemplary embodiment, the medium may be a pressurized liquid, semi-liquid or gas, the temperature of the medium may increase during the transfer and hence the pipe may also expand. The expansion and contractions may make the transfer pipe weak. The compensator may include, but not limited to, axial or lateral compensators in form of thermal shields, vacuum jackets, vacuum barriers, supporting structures, etc. In an aspect, the compensator may be a metallic flexible or hard pipe compensator to protect against excessive stresses and forces that can result from thermal contraction and expansion.

In aspects, the transfer skid may be a lattice structured transfer skid and may comprise one or more access platforms at one or more elevation levels from a lower base of the transfer skid to enable inspection and maintenance of the outboard assembly and the inboard assembly. The one or more access platforms may be movable up and down between the lower base and a top surface of the transfer skid. In an aspect, the access platforms may be foldable and/or slideable towards the outer periphery of the outboard assembly. The access platforms may also be removable at site if required, either through bolting arrangement or being foldable towards the side of the outboard assembly. In an aspect, the lattice structure may be wrapped with a net or a mesh in order to catch any dropped objects. In an aspect, a net or a mesh may be fitted or tied to the edges of the structural frame in order to cover a cross-sectional area of the structural frame at strategic elevation levels relative to the access platforms to protect any personnel from falling overboard as a safety measure.

In an aspect, the pipe supports may comprise one or more structural members fixedly attached to the transfer skid. The structural members may comprise one or more brackets perpendicularly welded to a baseplate. The one or more brackets and the baseplates, on one end may be welded or bolted to a surface of the transfer skid and on other end may be welded or bolted to the second pipe spool. Each of the structural members may be welded or bolted to doubling layer plates that sandwiches the second pipe spool. In an embodiment, the pipe supports may be bolted or welded to a surface of the outboard assembly of the transfer skid. In an embodiment, the pipe supports may rest on laminated compressed wood bearings, such as those sold by DEHONIT®, e.g. placed on the top surface of the transfer skid in order to thermally isolate the transfer skid from the second pipe spool.

In an aspect, a bellmouth may be attached to the transfer skid which may allow a passage for the transfer pipe, The bellmouth may restrict a bend radius of the transfer pipe. In another aspect, a bellmouth may be fixedly attached to the transfer pipe and releasably connected to the transfer skid.

In an aspect, the transfer pipe may be fitted with a bend stiffener, or the bend stiffener may be integrated into the transfer pipe structure or mounted on the outside as a sleeve. The bend stiffener may restrict a bend radius of the transfer pipe.

In an aspect, one or more buoyancy elements may be connected to the bellmouth. In an embodiment, one or more buoyancy elements may be connected to the transfer pipe. In an embodiment, buoyancy elements may be connected to a releasable portion of the coupling assembly.

In an aspect, the mounting means may comprise a plurality of brackets.

In an aspect, the first pipe spool may be supported by a pipe spool supporting means mounted on the first deck. In an aspect, the pipe spool supporting means may glidingly move along a length of the first pipe spool parallel to a surface of the first deck.

In an aspect, the transfer skid may comprise a winch system for pulling in the transfer pipe after the coupling assembly is disengaged. In an aspect, the winch system may comprise a fall arrest to limit a fall velocity of the transfer pipe when the coupling assembly may be disengaged. In an aspect, the winch system may be mounted on the second deck. In an aspect, the winch system may further comprise a guiding system for re-engagement of the coupling assembly. In an aspect, the guiding system may be a pin and collar system or a chain hoist system.

In an aspect, the first deck and the second deck may be at different elevation levels. In an aspect, the first deck and the second deck may be at same elevation level.

The present invention also relates to a process for transferring a medium between a first facility and a second facility through a transfer system. The medium may be transferred from a first pipe spool through a manifold provided on a first deck of the first facility to the second facility through a compensator, a second pipe spool, a transfer pipe. The second pipe spool may connect to the transfer pipe through a coupling assembly. The transfer pipe may fluidly be connectable with the second facility. The second pipe spool, the coupling and the transfer pipe passes through a transfer skid. The compensator may be configured to allow a relative motion between the first pipe spool and the second pipe spool. The transfer skid may comprise an inboard assembly and an outboard assembly. The inboard assembly may be mounted to a second deck of the first facility by one or more mounting means, and the outboard assembly may comprise a structural frame comprising an inner cross-sectional area to pass through one or more of the second pipe spool, the coupling assembly and the transfer pipe, and one or more pipe supports which may support the second pipe spool, the coupling assembly, the transfer pipe, or a combination thereof passing through the inner cross-sectional area of the transfer skid.

BRIEF DESCRIPTION OF DRAWINGS

The present invention will now be described with the help of the accompanying drawing.

DETAILED DESCRIPTION OF DRAWINGS

Figure 1:
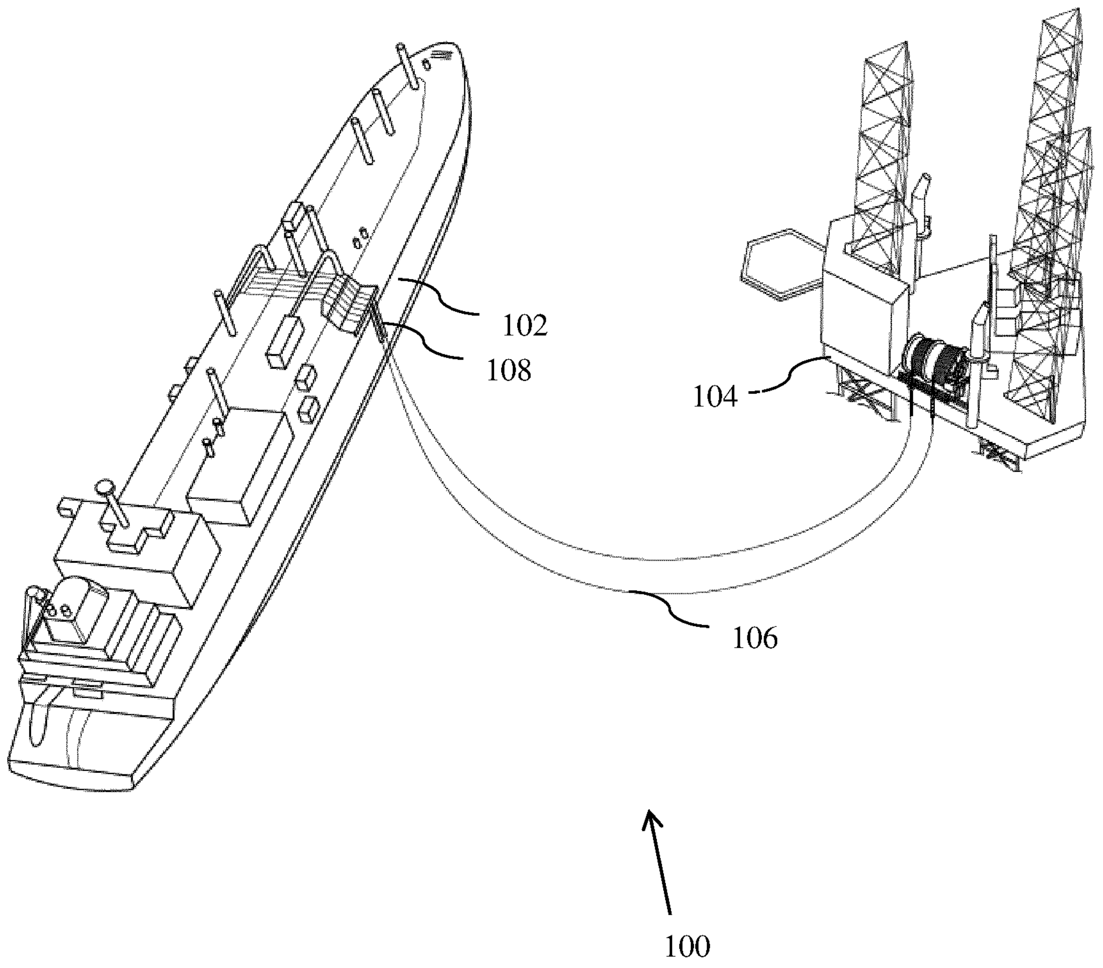
FIG. 1 illustrates a transfer system for a medium, in accordance with the embodiments of the present disclosure.

The present invention is capable of various modifications and various embodiments, and specific embodiments are illustrated in the drawings and will be described in detail in the detailed description. It is to be understood, however, that the invention is not to be limited to the specific embodiments, but includes all modifications, equivalents, and alternatives falling within the spirit and scope of the invention. The description herein is merely by way of example and illustration.

Hereinafter, the present invention will be described in detail with reference to the accompanying drawings.

The terminology used in this application is used only to describe a specific embodiment and is not intended to limit the invention. The singular expressions include plural expressions unless the context clearly dictates otherwise. In the present application, the terms "comprises" or "having" and the like are used to specify that there is a feature, a number, a step, an operation, an element, a component or a combination thereof described in the specification, But do not preclude the presence or addition of one or more other features, integers, steps, operations, elements, components, or combinations thereof.

The terms first, second, etc. may be used to describe various components, but the components should not be limited by the terms. The terms are used only for the purpose of distinguishing one component from another.

The description that follows the specific embodiments, fully disclose the overall nature of the embodiments provided herein. It is to be understood that the wording or language employed herein is for the purpose of description and not of limitation. Therefore, while the embodiments herein have been described in terms of preferred embodiments, those skilled in the art will recognize that the embodiments herein can be practiced with alteration within the essence and scope of the embodiments as described herein.

FIG. 1 illustrates a transfer system for a fluid, according to an embodiment of the present invention. The transfer system 100, as shown in FIG. 1 discloses a first facility 102 which may be a supply facility such as, but not limited to a floating vessel typically a ship, a floating storage and/or a carrier vessel. The first facility 102 may be, but not limited to, a regasification unit (FSRU), floating storage unit (FSU), carrier designed for storing and/or regasification of liquefied natural gas (LNG) or Liquid Petrochemical Gas (LPG). In an alternative embodiment, the first facility 102 can be a non-floating facility. Further, the fluid transfer system 100 includes a second facility 104 which may be a receiving facility. The second facility can be a floating unit such as, but not limited to, a semi-submersible platform, a non-gravity based non-floating unit, a gravity based non-floating unit, a ship, or other types of offshore or onshore units. In an embodiment, the first facility 102 and/or the second facility 104 may also have terminals with a power plant or regasification facility. Both the first facility 102 and the second facility 104 may be moored or installed at or near a site which may be a market or consumer of the fluid being transferred. The medium may be a fluid being transferred between a first facility 102 to a second facility 104 through one or more transfer pipes 106 which may be supported using a support structure assembly such as, but not limited to, a transfer skid 108. A transfer skid 108 may be provided on either one or both of the first facility 102 and the second facility 104. At least one transfer pipe 106 is fluidly connected between the first facility 102 and the second facility 104.

In an embodiment, the transfer skid 108 is mounted in such a manner that it may be transferable from one facility to another with minimal efforts. Also, the transferability is enabled in a manner that the structure of the facility is minimally impacted in terms of structural deformity or damage. In an embodiment, the transfer skid 108 may be attached to a deck of a facility.

In a preferred embodiment, the transfer skid 108 is a lattice structured transfer skid 108. In an embodiment, the transfer skid 108 may weigh approximately in a range of 5 to 10 tons. In an enabling embodiment, the transfer skid 108 may be transported in a 20 feet container and installed to a facility by using cargo cranes. Thus, the lattice structured transfer skid 108 is an easily transportable, manoeuvrable and re-installable structure. The transfer skid 108 may be sufficiently lightweight to be lifted by a crane on board the first facility 102 and/or the second facility 108 such that installation can be carried out on site with ease.

Figure 2A:
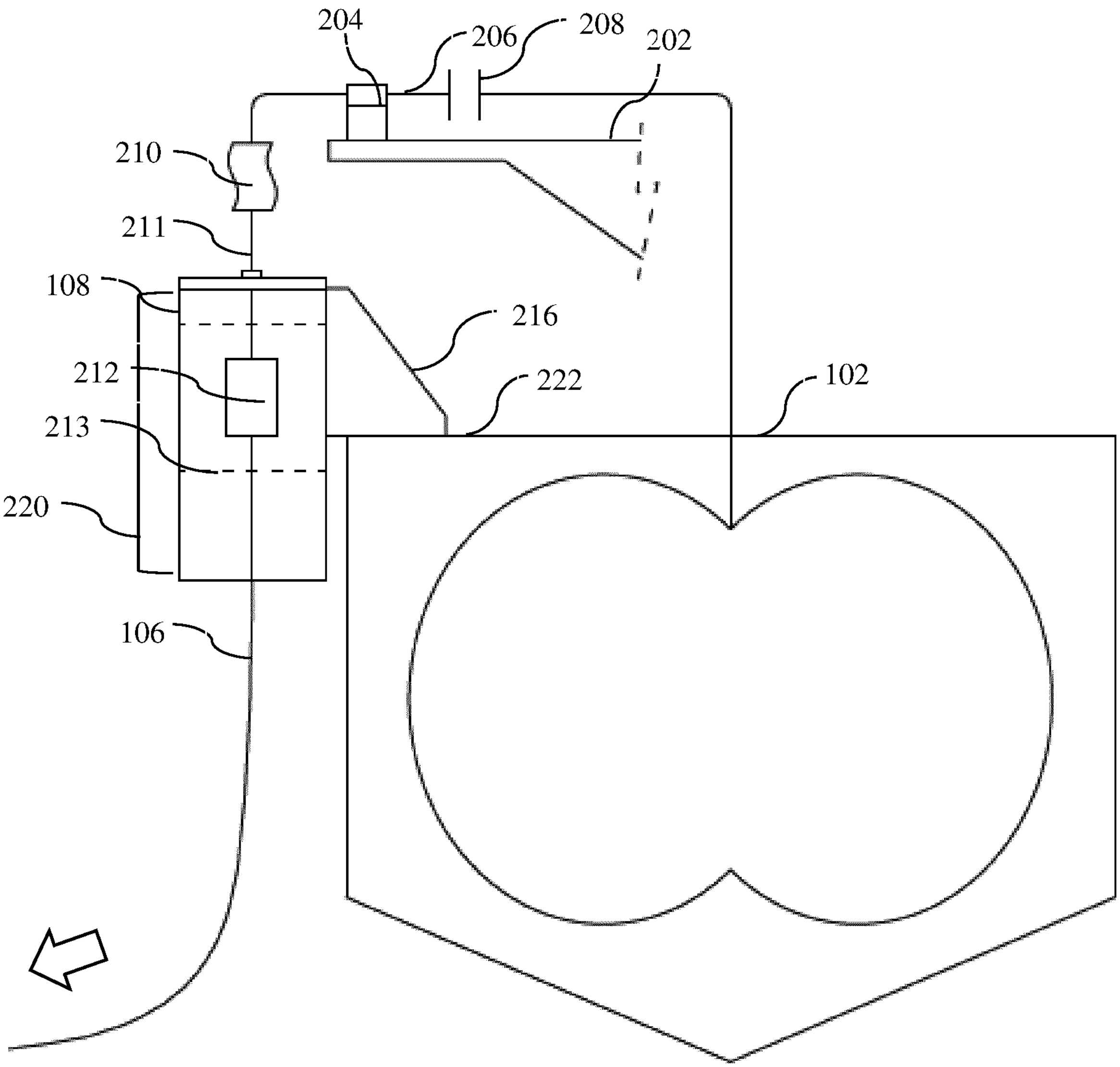
FIG. 2*a* illustrates a simplified side view of a transfer system, in accordance with the embodiments of the present disclosure.

FIG. 2*a* illustrates a simplified side view of a transfer system, according to an embodiment of the present invention. The first facility 102 as shown in FIG. 2*a* has two decks 202 and 222. In an embodiment, one or both the decks 202 and 222 are structurally re-enforced to support the load of one or more assemblies of the transfer system 100 directly or indirectly. In an embodiment, the decks 202 and 222 are provided at different elevations with respect to each other or may be at same elevation. In an embodiment, one of the decks may be structurally re-enforced for load bearing in order to transfer the load of the pipe spools 206, 211, coupling 212 and the transfer pipe 106. In an embodiment, the decks 202 and 222 may be structurally re-enforcement using, but not limited to, brackets, columns, metal frames, etc. in order to increase the load bearing capacity and to support the transfer system 100 as described herein. The decks 202 and 222 may be made of a material such as, but not limited to, wood, metal, an alloy, a polymer based material, or a combination thereof.

In an embodiment, the inboard assembly of the transfer skid 108 may comprise one or more mounting means 216 detachably mounted to the deck 222. The mounting means 216 may further comprise nuts and bolts, brackets and/or any other fastening device generally known in the art. As shown in FIG. 2*a*, the first deck 202 supports a pipe spool 206 connected from one end to a manifold 208 of a first facility 102. A pipe spool supporting means 204 is provided on the deck 202 in form of a gliding support which provides free axial movement to the pipe spool 206 along a length of the pipe spool 206 by keeping the pipe spool parallel to the surface of the deck 202. The pipe spool supporting means 204 supports the pipe spool 206 and allows for any thermal expansion and contraction of the pipe spool 206 and/or any other movement of the pipe spool 206. The other end of the pipe spool 206 is connected to a compensator 210. In an embodiment, the compensator 210 is, but not limited to, a metallic compensator, a pipe of low bending stiffness, a flexible pipe, a flexible joint, an expansion loop, a hose, or a bellow. In an exemplary embodiment, the medium being transferred may be a high pressure liquid, a cryogenic fluid, a liquid, a liquid gas, etc. Therefore, the compensator 210 may compensate the force exerted due to thermal expansion or contraction in the pipe spool 206 and may prevent a back flow of the medium.

In FIGS. 2*a*, 2*b*, 2*c* and 3, the pipe spool 206 is illustrated as a pipe segment, but may in a different embodiment be a flange, a weld connection, or any other type of connection device allowing the compensator 210 to be connected to the manifold 208.

In an exemplary embodiment, the fluid medium may be in a pressurized state with respect to the atmospheric pressures, hence transferring the fluid medium may increase the temperature of the process piping and the pipe spools 206, 211. Due to difference in temperature, the pipe spools 206, 211 may expand. The expansion and contractions may cause high stress in the pipe spools 206, 211 and supporting structure. In a high-pressure transfer system, large variation in both hoop and axial stress can arise in the process piping and the pipe spools 206, 211 due to large changes in internal pressure. This stress can elongate the pipe and can cause damage to potential flange connections, bends or support structures if the ends are fixed. The compensator 210 is configured to avoid transferring significant forces acting on one side of the compensator 210 to the other side.

Further, the compensator 210 is configured to allow a relative motion between the first pipe spool 206 and the second pipe spool 211. This avoids transferring of loads from forces acting on the second pipe spool 211 from the transfer pipe 106, to the manifold 208 of the first facility 102. The compensator also avoids transferring loads caused by thermal construction or expansion and/or internal pressure between the pipe spools 206, 211, A compensator 210 may prevent transferring of loads from forces acting on the transfer pipe 106, to the manifold 208 of the first facility 102. By introducing a compensator 210, the forces acting on one side of the compensator 210 may not be significantly transferred to the other side. In absence of a compensator 210, even a minor contraction of the material due to temperature variations may cause large stresses and concentrations in bends and supports. Rigidly anchoring of a pipe segment without compensation in two locations may cause large stress in the pipe segments between these two points. The manifold 208 on the facility 102 and the pipe support 214 constitute two such rigid anchors, but is compensated by the compensator 210, avoiding large stresses in the manifold or pipe support due to pipe elongation or contraction. Further, any small movements and/or vibrations may be transferred through the pipe support 204 to the first pipe spool 206, which may cause stress in the manifold 208 of the first facility 102. The compensator 210 may limit the effect of pressure surge events which may occur on either side of the compensator 210 in such a way that it may not significantly affect the piping and supports on either side of the compensator 210.

Further, the compensator 210 may include, but not limited to, axial or lateral compensators in form of thermal shields, vacuum jackets, vacuum barriers, supporting structures, etc. In an embodiment, the compensator 210 is a metallic flexible or hard pipe compensator to protect against excessive stresses and forces that can result from thermal contraction and expansion of the medium. The forces from the transfer pipe 106 may be supported by the transfer skid 108 and the pipe support 214 may be considered a fixed end support. The first pipe spool 206 may be connected to the manifold 208 of the facility 102 wherein the manifold 208 may be rigidly anchored to the first facility 102 and also considered a fixed end support. The compensator 210 is configured to change the nature of the boundary conditions of the pipe end supports; wherein the end supports changes from fixed end supports on both ends i.e. at the pipe support 214 and at the manifold 208 to one end having a fixed end support and the other having a gliding pin support 204 at the connection to the compensator 210.

The compensator 210 may be arranged at an angle which is 0 to 180 degrees relative to an axis A defined by a line drawn between the centreline of the first and the second end of the coupling assembly 212. This alignment increases the compensator's 210 ability to compensate and movement or misalignment.

In an embodiment, the manifold 208 is, but not limited to, a flanged manifold 208 which may fluidly connect the outlet or inlet of the facility 102 to the pipe spool 206. In an embodiment, the pipe spool supporting means 204 may support the pipe spool 206 in a gliding manner over channels attached to the deck 202 such that it may move in the length of the pipe spool 206 on the surface of the deck 202. In an embodiment, when a pressurized medium or a cryogenic medium is being transferred through the pipe spool 206, due to temperature difference or the difference between the pressure inside the first facility 102, the pressure inside the pipe spool 206 and the atmospheric pressure, there may be a tension or movement in the pipe spool 206 which may result in a movement or expansion of the pipe spool 206 with respect to the deck 202. The pipe spool supporting means 204 being slideably or glidingly connected to the deck 202 or being slideably or glidingly connected to the pipe spool 206, may glide through the length of the pipe spool 206 over channels etc. to compensate for the movement or expansion in the pipe spool 206, thereby preventing stress in or damage to the pipe spool 206.

The other end of the pipe spool 206 is fluidly connected to one end of the compensator 210. The other end of the compensator 210 is fluidly coupled to a second pipe spool 211. The second pipe spool 211 then enters the structural frame 220 of the transfer skid 108 through one or more pipe supports 214. The second pipe spool 211 is connected to the transfer pipe 106 through a coupling assembly 212. The transfer pipe 106 provides a fluid connection between the first facility 102 and the second facility 104 in order to transfer the fluid such as, but not limited to, a high pressure liquid or gas, a cryogenic medium, a liquid, a liquid gas, a gas, etc. The compensator 210 compensates the force, thermal expansion or contraction, back flow, etc. due to the excessive variations in the temperature or pressure of the fluid being transferred in the pipe spool 211.

The pipe spool 211 may comprise a pipe segment, e.g. as illustrated in FIG. 2*a*, but may in a different embodiment be a flange, a weld connection, or any other type of connection device allowing the compensator 210 to be connected to the transfer pipe 106 through the coupling assembly 212.

There might be small movements and vibrations that are transferred from the transfer pipe 106 through the pipe support 214 to the pipe section above, but any harmful effects of this is mitigated by the compensator 210. Further, pressure surge events occurring on either side of the compensator 210 will not in as large extent affect the piping and supports opposite of the compensator which limits the effect of such an event.

In case of a pressurized fluid, there may be a mismatch in the pressure levels between a container storing the pressurized fluid and the transfer pipe 106, which may result in an increase or decrease in temperature and/or pressure. As a result, the transfer pipe 106 and other pipe spools 211 may expand or contract. Therefore, the compensator 210 may compensate for the excessive pressure exerted by the pressurized fluid and prevents the transfer pipe 106 and pipe spools 206, 211 from collapsing or getting damaged. Thus, the compensator 210 reduces the risk of decoupling of the coupling assembly 212. The compensator 210 acts as a safety mechanism to ensure that there is no erroneous decoupling of the coupling assembly 212 during the transfer of the fluid. In an embodiment, each connection between pipe spools 206, 211 or between two rigid pipe supports may include a compensator in between in order to absorb any contraction, expansion and/or misalignment of pipe segments.

In another embodiment, the transfer skid 108 is a lattice structured transfer skid. The transfer skid 108 may be defined as having two portions or areas, an inboard assembly and an outboard assembly. The inboard assembly is inboard of the first facility 102 and may be mounted to the deck 222 as described herein. The outboard assembly of the transfer skid 108 is defined by a structural frame 220 which forms the periphery of the transfer skid 108 and provides a passage and support for the pipe spools 211, the coupling assembly 212, the transfer pipe 106, or any combination thereof.

The transfer skid 108 is preferably positioned and mounted to the deck 222 through the mounting means 216 such that the forces and movements of the outboard assembly are transferred directly onto a load bearing structure or the structurally re-enforced deck 222 of the first facility 102. Further, the mounting means 216 provides a sufficient distance between the outboard assembly and the inboard assembly of the transfer skid 108.

Further, the structural frame 220 of the outboard assembly of the transfer skid 108 includes one or more access platforms 213 which may be horizontal platforms (shown in FIG. 2*a*) made of a mesh type material with a circular hole in the centre as a passage of the second section of the pipe spool 211, the coupling assembly 212, the transfer pipe 106 or any combination thereof. In an embodiment, the circular hole of the access platforms 213 is big enough in diameter to prevent any collision of the pipe spool 211, the coupling assembly 212 or the transfer pipe 106 with the access platforms 213. In an embodiment, a flexible ring may be provided in the circumference of the circular hole to compensate for the movement of the pipe spool 211. In an embodiment, the access platforms 213 are provided at different elevation levels from a lower base of the transfer skid 108. In an embodiment, the elevation level of the access platforms 213 may be changed as per required manually or automatically, or they may be left in place as required. The access platforms 213 are accessible through a platform access such as a ladder or steps 228 (shown in FIG. 2*c*) provided in a space between or besides the mounting means 216. In an embodiment, there may be a mesh or net wrapping or covering the whole or parts of the transfer skid 108 at various elevation levels in order to capture any loose assembly, equipment or parts.

In an embodiment, the access platforms 213 may be foldable such that the platform may be folded towards the inboard assembly in order to make more space in order to pull through assemblies or chutes which require more operational space. The access platforms 213 may be include one or more hinges which may be locked in an open position and the hinges may be actuated to close through a lever or any mechanism known in the art. The access platforms 213 may be in folded position and opened one by one during installation of the coupling assembly 212.

In an embodiment, each of the access platforms 213 may have a hatch and a ladder connecting one access platform 213 to another through the ladder accessible though the hatch. In order to access the access platforms 213 from inside the outboard assembly of the transfer skid 108 a person may use the ladder through the hatch.

In an embodiment, the access platforms 213 may be fixed to the deck 222 through a couple of brackets. In an embodiment, the access platforms 213 may be moved up and down between a top end 218 and a bottom end 219 of the transfer skid 108 with respect to each other to access the outboard assemblies of the transfer skid 108.

In an embodiment, the access platforms 213 may be moved up and down using an elevator assembly or mechanism including, but not limited to, hydraulics, cable drives, pulleys, motors, etc. In an embodiment, the mesh structure of the access platforms 213 may be made of a material suitable enough to make the mesh platform rigid to hold weight of one or more persons who may stand on the access platform 213 in order to inspect the couplings and pipe structures inside the inner cross-sectional area of the transfer skid 108.

Figure 2B:
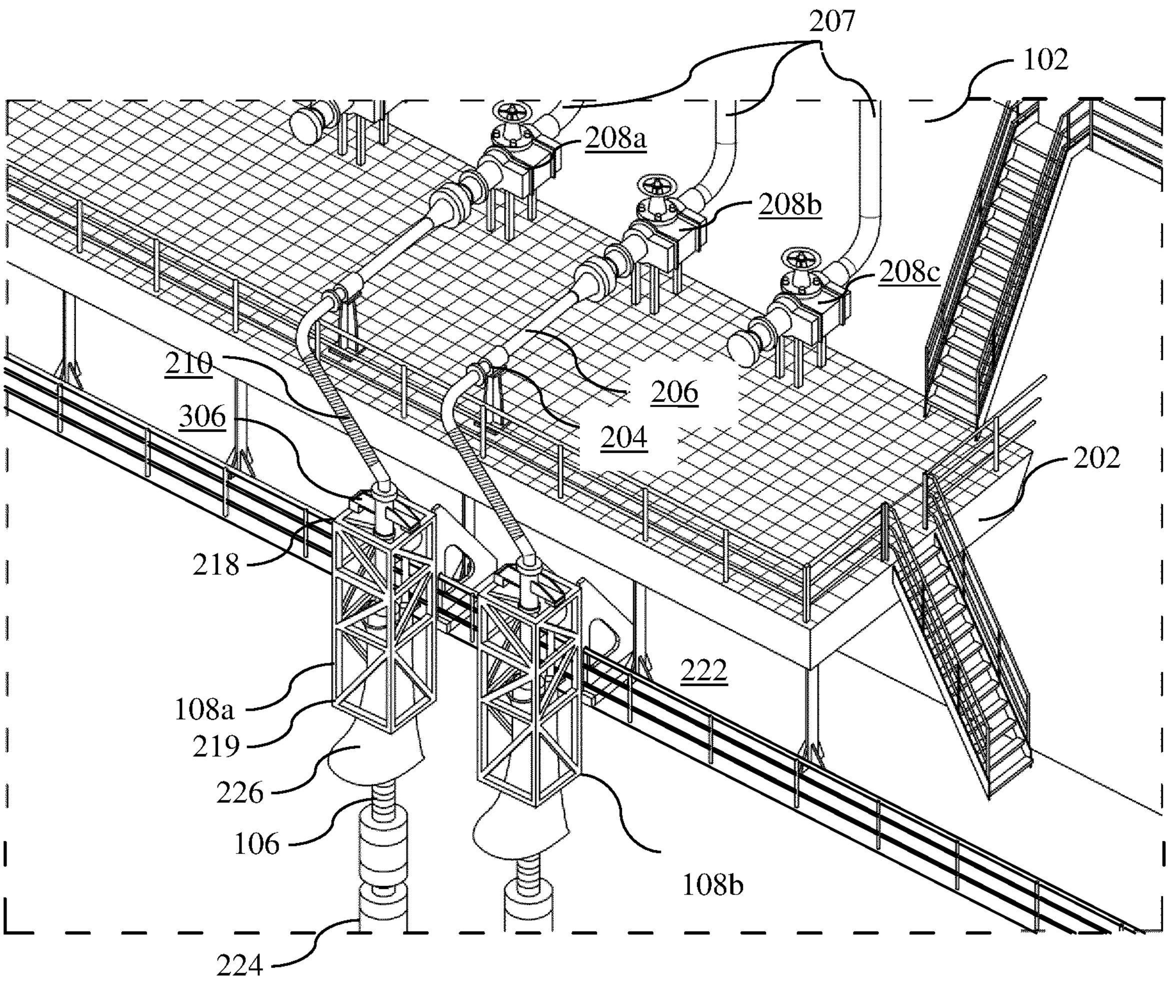
FIG. 2*b* illustrates a perspective view of a transfer system, in accordance with the embodiments of the present disclosure.

FIG. 2*b* illustrates a perspective view of a transfer system, according to an embodiment of the present invention. In reference to FIG. 2*b*, more than one first facility cargo piping 207 are seen, each ending with a manifold 208*a*, 208*b*, 208*c* fixedly supported on the deck 202. The deck 202 is accessibly connected to the deck 222 of the facility through a ladder or steps. Fluid medium being transferred from each of the manifolds 208 then flows into the pipe spools 206 which are connected to the compensators 210. From the compensators 210 the medium then traverses to the second pipe spools 211 into the transfer skids 108*a*, 108*b* and connects to the transfer lines 106*a*, 106*b* through the coupling assemblies 210. In an embodiment, the second pipe spool 211 when entering the transfer skid 108 from the top surface is supported by one or more pipe supports 214. The pipe support may have structural members in form of horizontal arms or arm supports which are coupled on one end to the frame of the transfer skid and on another end coupled to the second pipe spool 211. The structural members may be formed of one or more horizontal baseplates welded to perpendicular support arm brackets 604. The structural members may be welded or bolted to the structural frame 220 of the outboard assembly of the transfer skid 108 on one side and to an outer layer of the second pipe spool 211. In an embodiment, structural members may be welded to a doubling layer plate on one end which may sandwich the second pipe spool 211 from opposite sides. In an embodiment, the structural members may be hydraulically actuated arms which may enable the doubling layer plates to sandwich the second pipe spool 211 in between from two or more sides. In an embodiment, the pipe supports may be coupled using welding or bolts to the second pipe spool 211.

The structural members of the support arms may be MSH profiles, H-beams, I beams or any other structural members.

In an embodiment, the pipe supports may be attached to the structural frame 220 of the transfer skid 108 through laminated compressed wood bearings, such as those sold by DEHONIT®, placed on the top end 218 surface of the transfer skid 108. In essence, the pipe supports 214 are thermally isolated from the transfer skid 108 using laminated compressed wood bearings to prevent any thermal exchange between the second pipe spool 211 and the transfer skid 108, and thus avoiding embrittlement of lower grade steel on the transfer skid 108 and/or on the first facility 102.

As seen in the FIG. 2b the transfer skid 108 at the lower end is fixed with a bellmouth 226 allowing a passage for the transfer pipes 106. The bellmouth 226 restricts the bend radius of the transfer pipes 106. In one embodiment, the bellmouth 226 is fixedly attached to the transfer pipe 106 and releasably attached to the transfer skid 108. In an embodiment, the bellmouth 226 may follow the transfer pipe 106 when released and hence is releasably attached to the transfer skid 108. The transfer pipe 106 may wear out during pull-in due to high friction loads, high contact pressure and/or oblique angles, and also since the transfer pipe 106 may be pulled through the lattice structure transfer skid 108 using pulleys in combination with the winch system 314 with the wire in a S-shape. The lateral impact forces and friction forces may in this configuration be taken by the bellmouth 226 and the transfer skid 108 and not by the transfer pipe 106.

In an embodiment, the lattice structure transfer skid 108 may include a guide slit, fitted with Teflon, rollers, or similar material, which is wide in the bottom and narrower at the top. By adding a roller or curved plate at the bottom of the lattice structure transfer skid 108 to guide the wire during pulling in the bellmouth 226. In an embodiment, a pad eye mounted on the bellmouth 226 at an appropriate distance from the transfer pipe 106 end may be provided for the winch wire to be connected. In an embodiment, a guide wire to the transfer pipe 106 end might be included in addition to the winch wire to reduce twisting and turning. In an embodiment, the guide plate on the bellmouth 226 fits into the slit and guides it towards the top which is where the coupling assembly 212 is connected to the transfer pipe 106, and the bellmouth 226 is bolted in place. In an embodiment, the bellmouth is bolted to a hydraulic, mechanical or winch system which pulls-in the transfer pipe 106 the final distance and aligns and close the gap between the transfer pipe 106 flange with the coupling assembly 212 flange. In an embodiment, loose bolts and long bolt holes together with the bellmouth 226 guide is used for better accuracy in aligning the flanges when pulling in the bellmouth 226.

In an embodiment, a chain-pulley system may be used for the final stretch of the transfer pipe 106 pull-in, where the chain-pulley system is anchored to the top of the transfer skid 108 and its chains attached to one or more lugs on the transfer pipe 106 end fitting or the lugs on the releasable portion of the coupling assembly 212.

In an embodiment, the bellmouth 226 is releasably attached to the transfer skid 108 and one or more buoyancy elements 224 are connected to the bellmouth 226. The buoyance elements 224 are provided to keep the transfer pipe 106 floating after the coupling assembly 212 is disengaged. In an embodiment, the buoyancy elements 224 may be provided at a releasable end of the coupling assembly 212 in order to keep the transfer pipe 106 floating after the coupling assembly is un-coupled from the transfer pipe 106 end or the releasable portion of the coupling assembly 212 is uncoupled. Therefore, the buoyancy elements 224 keep the flexible lines 106 floating in case of decoupling of any of the coupling assemblies 212.

Figure 2C:
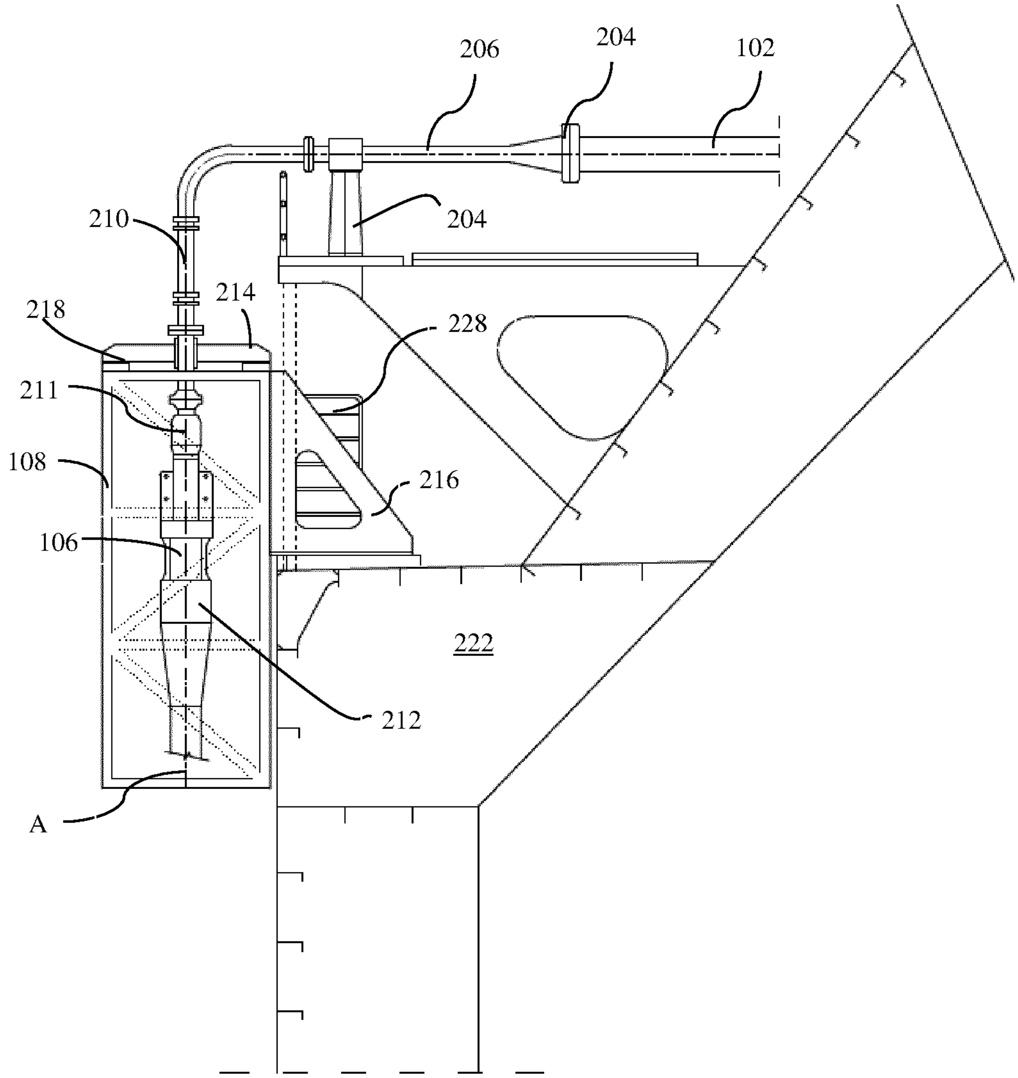
FIG. 2*c* illustrates a side view of the transfer system with access platforms in the inboard assembly, in accordance with the embodiments of the present disclosure.

FIG. 2c illustrates a side view of the transfer system, according to an embodiment of the present invention. As shown in FIG. 2c the transfer skid 108 is attached to the deck 222 by a mounting means 216. The outboard assembly is cantilevered outboard the first facility 102. The mounting means 216 may be selected as, but not limited to, one or more brackets, a frame structure comprising structural members, or a combination of brackets and beams. The mounting means 216 may be removably attached to the outboard assembly of the transfer skid 108 on one side and may be dismountably mounted to the deck 222 from a second. As shown in FIG. 2c an assembly of the second pipe spool 211, the coupling assembly 212 and the transfer pipe 106 passing inside the passage of the structural frame 220 of the transfer skid 108 is shown for purpose of elaboration and explanation by obscuring the outboard structure of the transfer skid 108 from one side. In one embodiment, the first facility 102 is a supply facility, and a cargo piping 207 on the facility 102 is directed towards a manifold 208 of the facility 102 to continue through a first portion of a pipe spool 206. In an embodiment, the manifold 208 is a connectable manifold in order to provide connection for the first end of the pipe spool 206 which may have a reducer or conical end shape to accommodate any diameter difference between the manifold 208 on the facility 102 and the flange or connector of the pipe spool 206. Further, a second end of the pipe spool 206 is connected to an inlet of a compensator 210, the outlet of which is connected to a second section of the pipe spool 211 which enters a structural frame 220 of the transfer skid 108 through a pipe support 214. The pipe support 214 comprises one or more support arms welded to the edges of the top most end 218 of the transfer skid 108 through which the second pipe spool 211 enters a inner cross-sectional area of the outboard assembly of the transfer skid 108. In an embodiment, pipe support 214 may be provided inside the inner cross-sectional area of the outboard assembly of the transfer skid 108 and welded to the structural members of the transfer skid 108. Two vertical brackets are welded perpendicularly to a horizontal baseplate to form the structural arms which are welded or bolted on one side to the transfer skid 108 and to a doubling layer plate on the other side which may be a vertical plate placed on either side of the second pipe spool 211 such that the two vertical plates from opposite ends sandwich the second pipe spool 211 in between. The doubling layer plate may increase the thickness of the second pipe spool 211 and hence increase the strength of the second pipe spool 211. The horizontal baseplates of the pipe support 214 are bolted to an edge of the top end 218 surface of the transfer skid 108 through laminated compressed wood bearings, such as those sold by DEHONIT®, in order to thermally isolate the transfer skid 108 from the second pipe spool 211. In an embodiment, multiple pipe support 214 may be attached to the diagonal ends of the top square surface at the top end 218 of the transfer skid 108 to sandwich the second pipe spool 211 between multiple pair of doubling layer plates in order to increase the support of the second pipe spool 211. The doubling layers may also be created by having a section of the second pipe spool 211 with a larger thickness than the rest of the pipe spool 211 with the same effect. In one embodiment, the multiple pipe support 214 may be attached to the centre of the sides of the top square surface of the top end 218 of the transfer skid 108. In an embodiment, multiple pipe support 214 may be attached to the lattice structure frame of the transfer skid 108 inside the passage of the transfer skid 108.

Further, the second section of the pipe spool 211 is coupled to the flexible transfer pipe 106 through a coupling assembly 212. The coupling assembly 212 used herein may be selected as one or more of, but not limited to, Quick Connection Disconnection Coupling (QCDC), Manual Release Coupling (MRC), Emergency Release Coupling (ERC), flanges, etc.

The transfer pipe 106 exits the transfer skid 108 through a bellmouth 226, attached to the transfer pipe 106. In an embodiment, a bend restrictor may be provided in place of the bellmouth 226 to restrict the bending radius of the transfer pipe 106 in order to avoid damaging or fatiguing the transfer pipe. Without a bellmouth, the coupling assembly 212, the second pipe spool 211, and the pipe support 214 must be dimensioned to support the bending moments from the transfer pipe 106. Therefore, the bellmouth 226 or the bend restrictor supports the equipment for a safe and reliable transfer of medium from the first facility 102 to the second facility 104 and to withstand the forces and movements of transfer pipe 106 due to water currents or sea movements.

The pipe spool 211 may be fitted with pressure relief valves (PSVs) to protect shut in volumes between first facility 102 and the coupling assembly 212.

For low pressure liquid gases, the pressure relieving system ensures that any trapped liquid as caused by an ESD event, maloperation or spurious valve closure will not lead to pressure build up exceeding the pressure rating of the system. On the first facility 102, pressure safety valves (PSVs) mounted on the first pipe spool 206, and/or the second pipe spool 211, and/or as part of the coupling assembly 212 are protecting the volumes outboard of the first facility 102 emergency shut down valve (ESDV) and inboard of the ERC part of the coupling assembly 212. The relieved volumes will be routed to one of the existing pressure protection lines going back to the nearest cargo tank on the first facility 102. On the second facility, pressure safety valves will protect the volumes potentially shut in between the breakaway half of the ERC part of the coupling assembly 212 and the emergency shut down valve (ESDV) on the second facility 104. The relieved volumes may be led to a Knock-Out Drum (KOD), from where the exhaust line will be connected to one of the existing pressure relieving lines of the second facility.

For high pressure fluids, a blow down system allows for rapid depressurizing prior to ESD 2, i.e. activation of the ERC and release of the transfer pipe from the transfer skid. The blow-down pipe is fluidly connected to the space between the two isolation valves on each side of the ERC halves.

Figure 3:
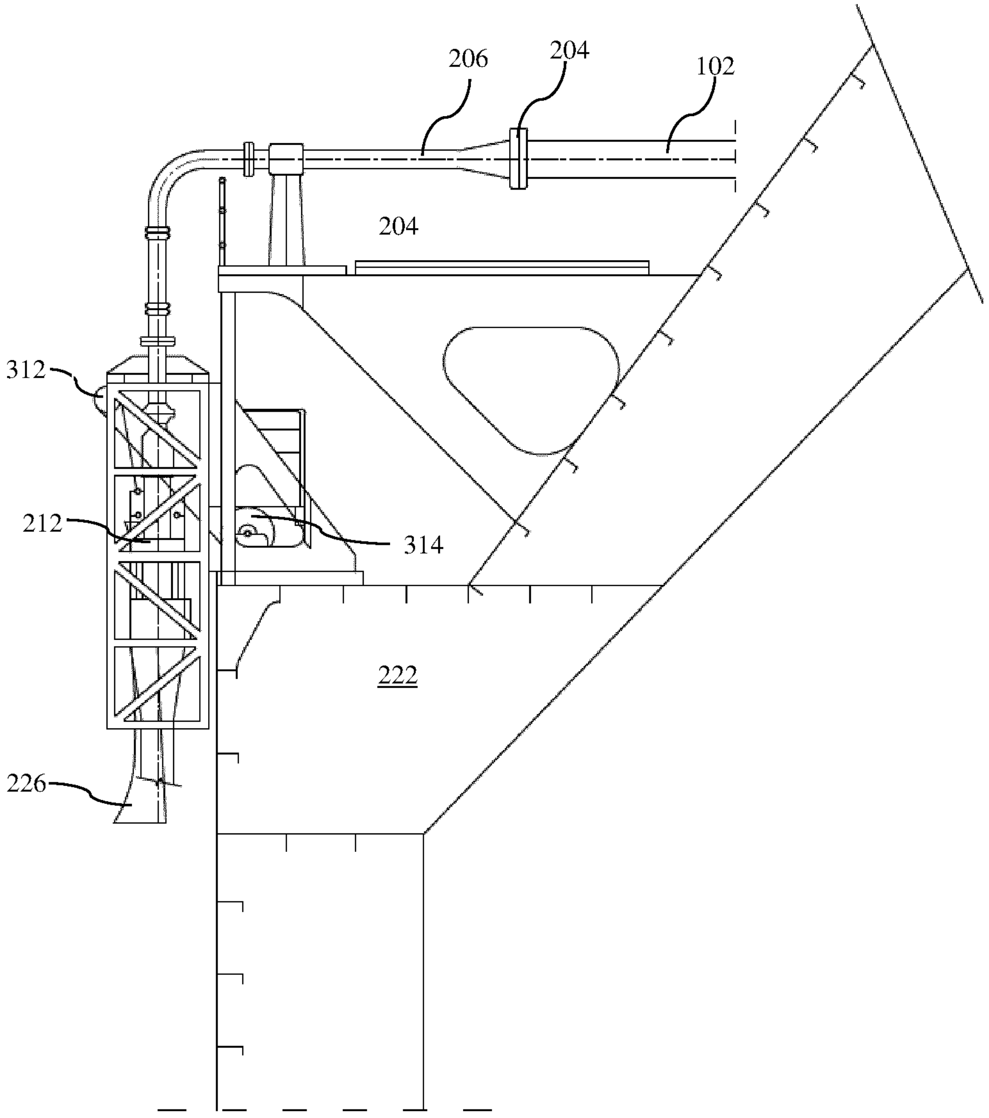
FIG. 3 illustrates a side view of the transfer system with winch system and fall-arrest system, in accordance with the embodiments of the present disclosure.

FIG. 3 illustrates a side view of the transfer system with winch system, according to an embodiment of the present invention.

In an embodiment, the transfer skid 108 may include an Emergency Release System (ERS). An emergency release coupling (ERC) part of the coupling assembly 212 is provided as coupling between the pipe spool 211 and the transfer pipe 106 inside the inner cross-sectional area of the structural frame 220 of the transfer skid 108. The transfer system 100 may include a winch system 314 which may include a trolley or a pulley 312 though which a rope of the winch system 314 passes and is connected to the transfer pipe 106 or the releasable portion of the coupling assembly 212 to control a fall of the de-coupled end of the transfer pipe 106 as a result of de-coupling of the ERC or coupling assembly 212 between the pipe spool 211 and the transfer pipe 106. In an embodiment, the fall arrest device 312 may include one or more wires or ropes which may be connected to a lifting lug 402 on either the releasable part of the coupling assembly 212 or on a spool piece integrated in the end fitting of the transfer pipe 106. When the ERC is disengaged or released, the rope or wire of the fall arrest system 314 prevents the flexible transfer pipe 106 from falling rapidly and uncontrollably to the sea or water and hence prevents any damages on the transfer pipe 106 or coupling assembly 212 from impact with the facility 102 or the sea or water. Further, the winch system 312 may be a combined fall arrest system and a lifting winch, wherein the lifting winch may enable retrieval of the fall arrest ropes or wires by means of a mechanical, hydraulicly or electrically operated pulley system in order to retrieve the flexible transfer pipe 106 and to facilitate the re-engagement of the coupling 212.

Figure 4:
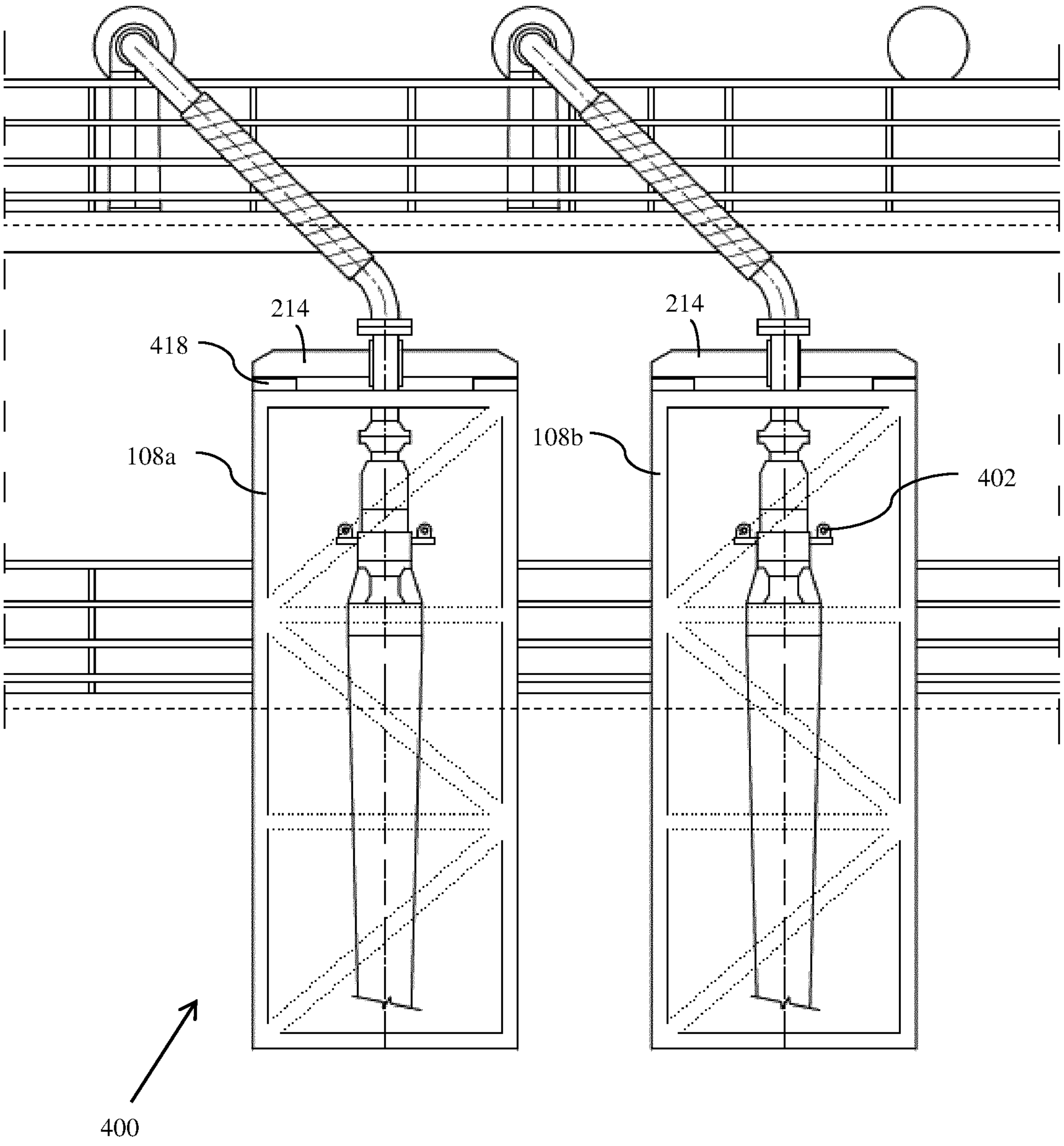
FIG. 4 illustrates a front view of the transfer system with lifting lugs for chain hoist guidance system, in accordance with the embodiments of the present disclosure.

FIG. 4 illustrates a front view of the transfer system, according to an embodiment of the present invention. The front view of the transfer support system depicts two transfer skids 108*a* and 108*b* being mounted to the deck 222. In an embodiment, multiple transfer skids 108 may be mounted on to the deck 222 in order to provide transfer through multiple transfer pipes 106 between the facilities. In an embodiment, one or more pipe supports 214 are seen resting on laminated compressed wood bearings 418, such as those sold by DEHONIT®, over a top end 218 surface of the transfer skid 108. Each of the end fittings of the compensator 210 have integrated bends to allow connection to a vertical flange connection at the second pipe spool 206 on one end, and to the horizontal pipe spool 211 on the other end, which enables the pipe spools 206, 211 to be straight pipe sections.

Figure 5:
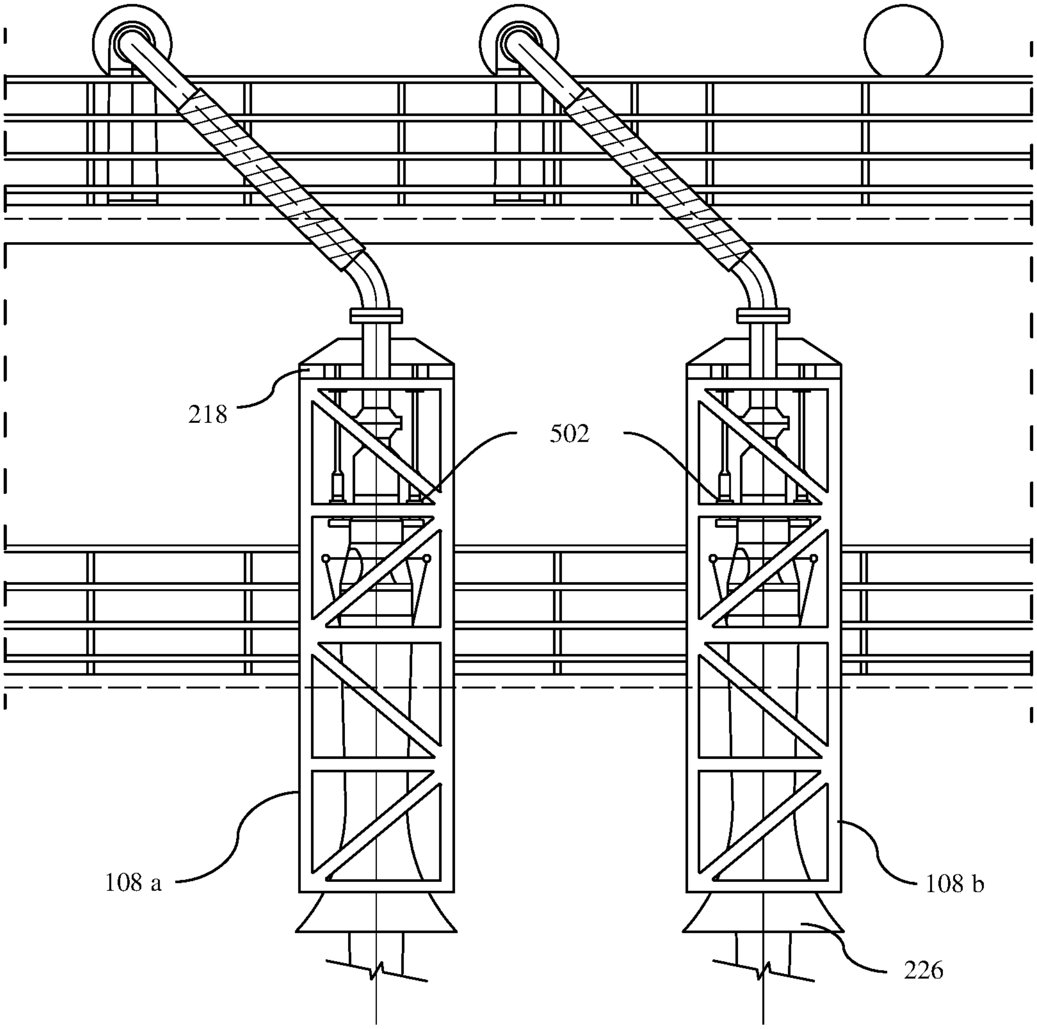
FIG. 5 illustrates a front view of the transfer system with a guiding system, in accordance with the embodiments of the present disclosure.

FIG. 5 illustrates a front view of the transfer system with a guiding system, according to an embodiment of the present invention. The transfer skid 108 regardless of the orientation of the first facility 102 is designed such that the connection surface of the coupling assembly 212 is parallel with the connection surface of the transfer pipe 106, with the help of a guiding system 504 such as, but not limited to a pin and collar system 502 or a chain hoist system 502 attached to the connector flanges of the coupling 212. Lugs for connection of the chain hoist system is illustrated in FIG. 4.

In an embodiment, a pin and collar guiding system 504 is connected to an upper portion of the top end 218 of the transfer skid 108 to pull the flexible transfer pipe 106 through the bellmouth 226 to re-engage ERC and hence the connection between the flexible transfer pipe 106 and the pipe spool 211 through the coupling assembly 212.

In an exemplary embodiment, while transferring a fluid, in an emergency situation there may be a need to quickly disconnect the transfer system 100 by isolating and/or separating the first facility 102 from the second facility 104. After such emergency situation where the coupling assembly 212 has to be dis-engaged or reassembled, the guidance system 504 helps in re-engaging the coupling 212. In an embodiment, an upstream and a downstream emergency shutdown valve prevents or reduces any leakage of transferred medium between the first facility 102 and the second facility 104.

In an embodiment, the emergency shutdown valve may have an open and a closed position and that can be placed in the closed position prior to an emergency release of the ERC, which is normally part of the ESD philosophy.

In an embodiment, the coupling assembly is often heavy and often comprises components manufactured in steel or other strong and heavy materials and is thus not positively buoyant. In order to keep the second half of coupling assembly and the transfer pipe 106 afloat in the water after an emergency release, a buoyancy and protection module with sufficient buoyancy may be mounted to the coupling assembly. The buoyancy and protection module may also provide protection avoiding spurious opening of the downstream emergency shutdown valve and assuring that critical components don't become damaged during the fall. Furthermore, the buoyancy and protection device also offers protection of the hull with its softer properties compared to steel and avoids the risk of sparks during the fall.

Figure 6A:
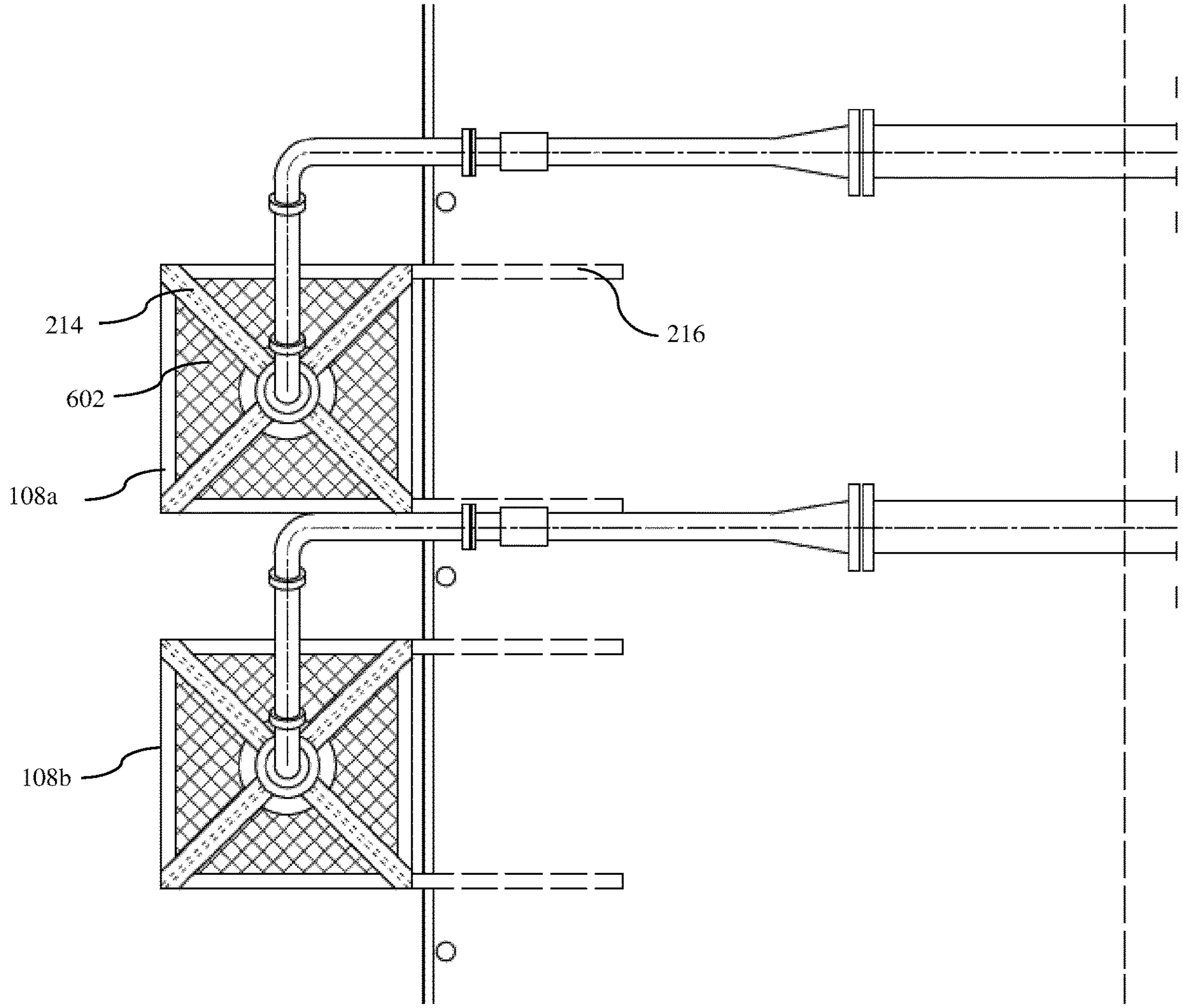
FIG. 6*a* illustrates a top view of the transfer system, in accordance with the embodiments of the present disclosure.

FIG. 6*a* illustrates a top view of the transfer system, according to an embodiment of the present invention. As shown in FIG. 6*a*, two pair of pipe supports 214 and the mesh surface 602 of access platforms 213 inside the transfer skid 108. The mesh surface 602 which may be made of metal or a rigid material such as but not limited to, polymer, metal alloy, or any combination thereof. The mesh surface 602 may be supported by metal railings on the sides and a circular central hole. In an embodiment, a flexible support ring such as a washer is placed in the circumference of the central hole. In an embodiment, the diameter of the central hole is large enough to enable passage for the pipe spool 211, coupling assembly 212, transfer pipe 106 or any combination thereof through it. The access platforms 213 are mounted to the outboard assembly through mounting means such as brackets bolted or welded to the outboard assembly of the transfer skid 108, or through mounting means such as brackets bolted or welded to the inboard assembly of the transfer skid 108 and/or to the deck 222. In an embodiment, the pipe supports 214 are provided at the diagonal ends of the top end 218 surface of the transfer skid 108.

Figure 6B:
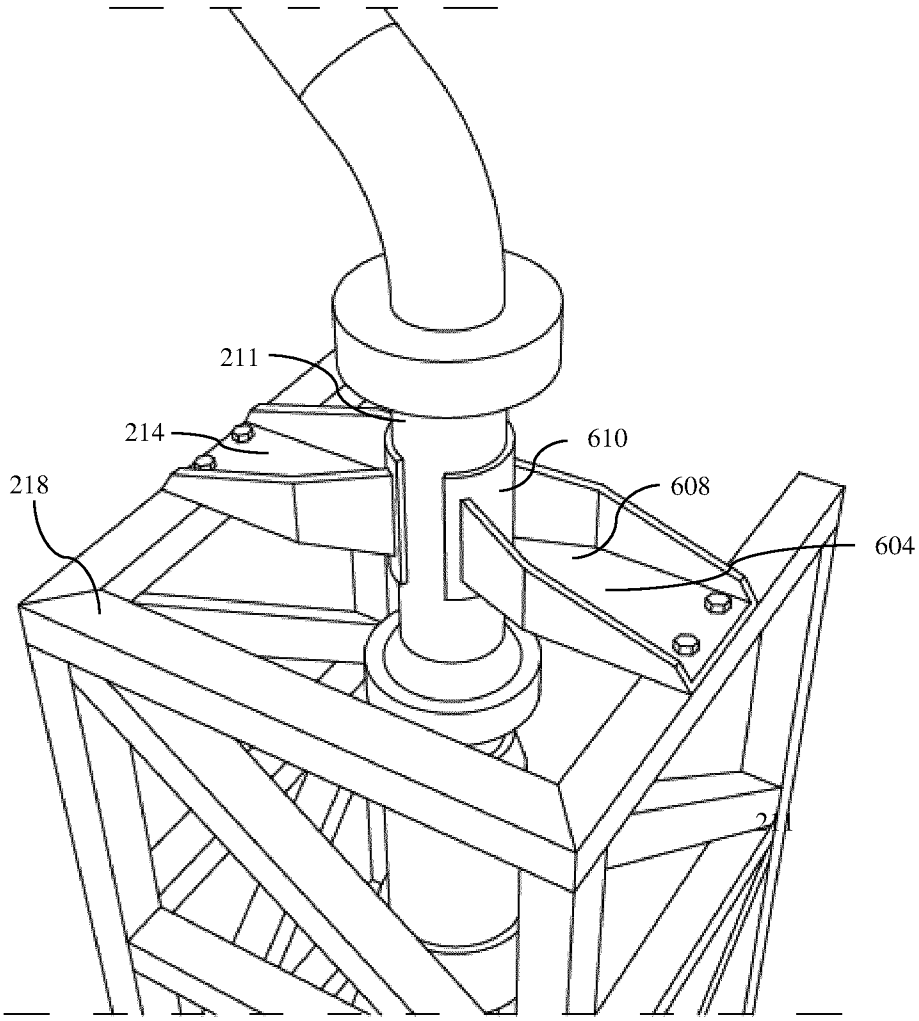
FIG. 6*b* illustrates a perspective view of a top portion of the transfer skid, in accordance with the embodiments of the present disclosure.

FIG. 6*b* illustrates a perspective view of a top portion of the transfer skid, according to an embodiment of the present invention. The pipe support 214 is shown to have a baseplate 608 which is a horizontal plate parallel to the surface of the top end 218 of the transfer skid 108. Two brackets 604 are welded to the baseplate 608 to form one side of the pipe support 214. The pipe supports on one side are bolted (as shown) or welded to the transfer skid 108. On the other side the pipe supports are welded or bolted to doubling layer plates 610 which are vertical plates sandwiching the second pipe spool 211 between them.

Figure 7:
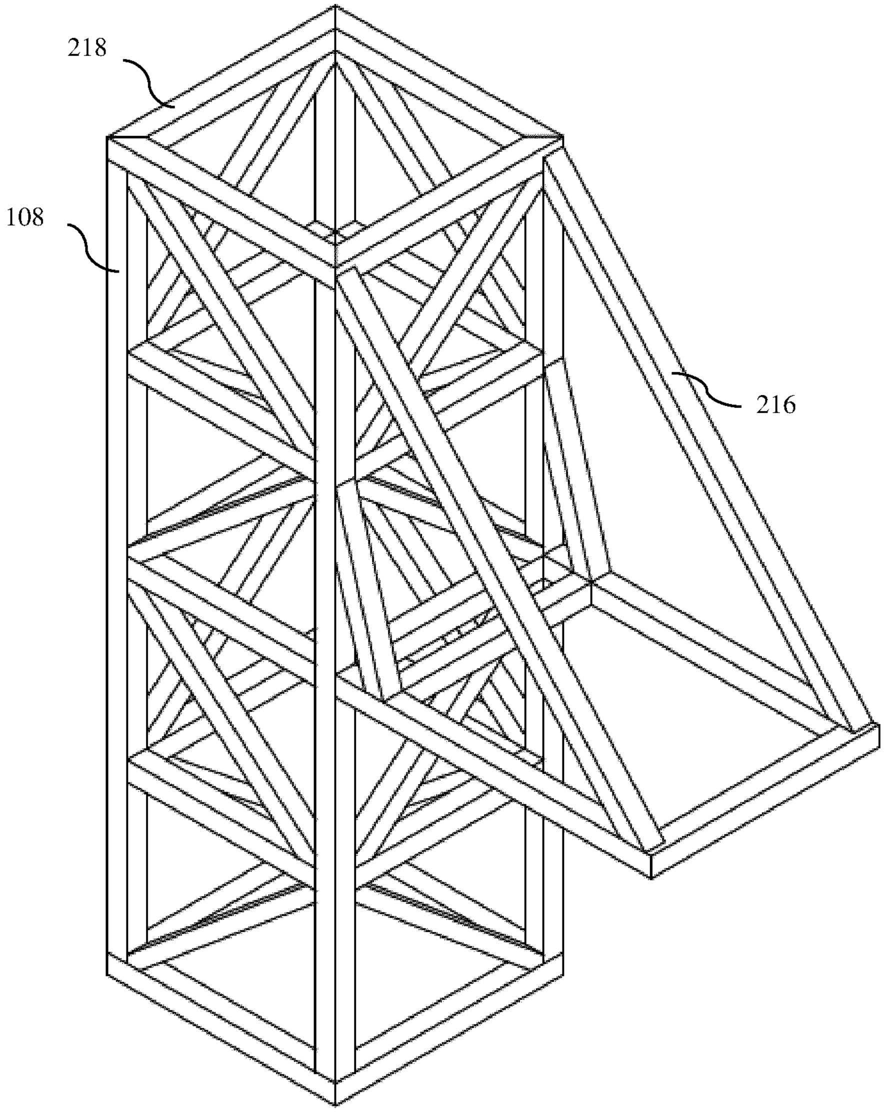
FIG. 7 illustrates a perspective view of a lattice structured transfer skid, in accordance with the embodiments of the present disclosure.

FIG. 7 illustrates a perspective view of a lattice structured transfer skid, according to an embodiment of the present invention. The transfer skid 108 is a lattice structured transfer skid 108 made of metal lattices joined or fastened together through welding or bolting. The inboard assembly comprising the mounting means 216 may be bolted or welded to the structurally re-enforced deck of a facility 222. The lattices of the transfer skid 108 allows for an easy installation, monitoring, maintenance of the connection and support assembly which is installed inside the inner peripheral area of the transfer skid 108.

The present invention has been described with reference to some drawings and a preferred embodiment purely for the sake of understanding and not by way of any limitation and the present invention includes all legitimate developments within the scope of what has been described herein.

Depending on the embodiment, certain acts, events, or functions of any of the processes described herein can be performed in a different sequence, may be added, merged, or left out altogether. Thus, in certain embodiments, not all described acts or events are necessary for the practice of the processes. Moreover, in certain embodiments, acts or events may be performed concurrently.

Conditional language used herein, such as, among others, "can," "could," "might," "may," "e.g.," and the like, unless specifically stated otherwise, or otherwise understood within the context as used, is intended in its ordinary sense and is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous, are used in their ordinary sense, and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is understood with the context as used in general to convey that an item, term, element, etc. may be either X, Y or Z. Thus, such conjunctive language is not generally intended to imply that certain embodiments require at least one of X, at least one of Y and at least one of Z to each be present.

It should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Further, no component, feature, step, or group of components, features, or steps are necessary or indispensable for each embodiment. Thus, it is intended that the scope of the inventions herein disclosed and claimed below should not be limited by the particular embodiments described above, but should be determined only by a fair reading of the claims that follow.

The invention claimed is:

1. A transfer system for transferring a medium between a first facility and a second facility, the transfer system comprises:

a first pipe spool; a compensating pipe section; a second pipe spool; a coupling assembly; a transfer skid; and one or more pipe supports, wherein a first end of the first pipe spool is connectable to a manifold provided on a first deck of the first facility and a second end of the first pipe spool is connected to a first end of the compensating pipe section, wherein a first end of the second pipe spool is connected to a second end of the compensating pipe section and a second end of the second pipe spool is connectable to a first end of a transfer pipe through the coupling assembly, wherein the compensating pipe section is configured to allow a relative motion between the first pipe spool and the second pipe spool, wherein the transfer pipe is fluidly connectable with the second facility, wherein the transfer skid comprises an inboard assembly and an outboard assembly, wherein the inboard assembly is mountable to a second deck of the first facility by one or more mounting fasteners, and wherein the outboard assembly comprises:

a structural frame comprising an inner cross-sectional area configured to allow passage of one or more of the second pipe spool, the coupling assembly, and the transfer pipe, and the one or more pipe supports supporting the second pipe spool, the coupling assembly, the transfer pipe, or a combination thereof passing through the inner cross-sectional area of the transfer skid.

2. The transfer system according to claim 1, wherein the coupling assembly comprises a flange to flange connection.

3. The transfer system according to claim 1, wherein the coupling assembly comprises one or more flanges, one or more of valves, one or more couplings or any combination thereof.

4. The transfer system according to claim 3, wherein the one or more couplings comprises: an emergency release coupling, a Quick Connect and Disconnect Coupling, a Manual Release Coupling, or any combination thereof.

5. The transfer system according to claim 1, wherein the transfer skid is a lattice structured transfer skid.

6. The transfer system according to claim 1, wherein the compensating pipe section is a flexible pipe, a flexible joint, an expansion loop, or a hose.

7. The transfer system according to claim 1, wherein the compensating pipe section is a metallic impennate compensating pipe section, a pipe of low bending stiffness, or a bellow.

8. The transfer system according to claim 1, wherein the transfer skid comprises one or more access platforms at one or more elevation levels from a lower base of the transfer skid to enable inspection and maintenance of the outboard assembly and the inboard assembly.

9. The transfer system according to claim 8, wherein the one or more access platforms are movable up and down between a top end and a bottom end of the transfer skid.

10. The transfer system according to claim 1, wherein the one or more pipe supports comprises one or more structural members fixedly attached to the transfer skid.

11. The transfer system according to claim 10, wherein each of the structural members comprises one or more brackets perpendicularly welded to a baseplate, wherein the one or more brackets and the baseplates, on one end are welded or bolted to a surface at the top end of the transfer skid and on other end is welded or bolted to the second pipe spool.

12. The transfer system according to claim 11, wherein each of the structural members are welded or bolted to doubling layer plates that sandwiches the second pipe spool.

13. The transfer system according to claim 1, wherein the one or more pipe supports are bolted or welded to a surface of the outboard assembly of the transfer skid.

14. The transfer system according to claim 1, wherein the one or more pipe supports rests on a laminated compressed wood bearing placed on the surface of the top end of the transfer skid to thermally isolate the transfer skid from the second pipe spool.

15. The transfer system according to claim 1, further comprises a bellmouth attached to the transfer skid allowing a passage for the transfer pipe, wherein the bellmouth restricts a bend radius of the transfer pipe.

16. The transfer system according to claim 1, further comprises a bellmouth fixedly attached to the transfer pipe and releasably connected to the transfer skid.

17. The transfer system according to claim 16, further comprises one or more buoyancy elements connected to the bellmouth.

18. The transfer system according to claim 1, further comprises one or more buoyancy elements connected to the transfer pipe.

19. The transfer system according to claim 1, wherein one or more buoyancy elements are connected to a releasable portion of the coupling assembly.

20. The transfer system according to claim 1, wherein the one or more mounting fasteners comprises a plurality of brackets connecting the outboard assembly to the inboard assembly such that an open space is provided between the plurality of brackets.

21. The transfer system according to claim 1, wherein the first pipe spool is supported by a pipe spool support mounted on the first deck.

22. The transfer system according to claim 21, wherein the pipe spool support is glidingly movable along a length of the first pipe spool parallel to a surface of the first deck.

23. The transfer system according to claim 1, wherein the first deck and the second deck are at different elevation levels.

24. The transfer system according to claim 1, wherein the transfer skid further comprises a winch system for pulling in the transfer pipe after the coupling assembly is disengaged.

25. The transfer system according to claim 24, wherein the winch system comprises a fall arrest to limit a fall velocity of the transfer pipe when the coupling assembly is disengaged.

26. The transfer system according to claim 24, wherein the winch system is mounted on the second deck.

27. The transfer system according to claim 24, wherein the winch system further comprises a pipe guide for re-engaging the coupling assembly.

28. The transfer system according to claim 27, wherein the pipe guide is a pin and collar system.

29. The transfer system according to claim 27, wherein the pipe guide is a chain hoist system.

30. The transfer system according to claim 1, wherein the first facility is a floating facility.

31. The transfer system according to claim 1, wherein the second facility is a gravity based non-floating facility.

32. The transfer system according to claim 1, wherein the second facility is one of a non-gravity based non-floating unit, a floating unit, a ship, a type of offshore unit, or a type of onshore unit.

33. A process for transferring a medium between a first facility and a second facility through a transfer system comprising:

transferring the medium from a first pipe spool through a manifold provided on a first deck of the first facility to the second facility through a compensating pipe section, a second pipe spool, a transfer pipe, wherein the second pipe spool is connected to the transfer pipe through a coupling assembly, wherein the transfer pipe is fluidly connectable with the second facility, wherein the second pipe spool, the coupling and the transfer pipe passes through a transfer skid, wherein the compensating pipe section is configured to allow a relative motion between the first pipe spool and the second pipe spool, wherein the transfer skid comprises an inboard assembly and an outboard assembly, wherein the inboard assembly is mounted to a second deck of the first facility by one or more mounting fasteners, and the outboard assembly comprises:

a structural frame comprises an inner cross-sectional area to pass through one or more of the second pipe spool, the coupling assembly and the transfer pipe, and one or more pipe supports supporting the second pipe spool, the coupling assembly, the transfer pipe, or a combination thereof passing through the inner cross-sectional area of the transfer skid.

* * * * *